(12) United States Patent
Kerner et al.

(10) Patent No.: US 6,970,761 B2
(45) Date of Patent: Nov. 29, 2005

(54) METHOD FOR ACTUATING A HOLDING BRAKE

(75) Inventors: Norbert Kerner, Traunwalchen (DE); Frieder Kohler, Lauter (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 23 days.

(21) Appl. No.: 10/463,053

(22) Filed: Jun. 16, 2003

(65) Prior Publication Data

US 2004/0002775 A1 Jan. 1, 2004

(30) Foreign Application Priority Data

Jun. 29, 2002 (DE) ................................ 102 29 350

(51) Int. Cl.$^7$ ............................................. G06F 19/00
(52) U.S. Cl. ...................... 700/170; 700/173; 700/174; 700/178; 188/156; 188/158; 188/159; 188/160; 303/3; 303/7; 303/15; 303/20
(58) Field of Search ................................ 700/170, 173, 700/174, 178; 188/156, 158–160; 303/3, 303/7, 15, 20

(56) References Cited

U.S. PATENT DOCUMENTS

| | | | | |
|---|---|---|---|---|
| 3,949,582 A | * | 4/1976 | Eaton et al. ................. | 72/17.2 |
| 4,206,393 A | * | 6/1980 | Chiba ......................... | 318/632 |
| 4,347,471 A | * | 8/1982 | Kohzai et al. ............... | 318/616 |
| 4,485,594 A | * | 12/1984 | Guertin et al. .................. | 451/5 |
| 5,117,544 A | * | 6/1992 | Kousaku et al. ............ | 29/27 C |
| 5,144,213 A | | 9/1992 | Sasaki et al. | |
| 5,550,733 A | * | 8/1996 | Yun et al. ..................... | 700/69 |
| 5,596,931 A | * | 1/1997 | Rossler et al. .............. | 101/484 |
| 5,874,799 A | * | 2/1999 | Mitarai et al. ......... | 310/316.01 |
| 5,875,158 A | * | 2/1999 | Schell ..................... | 369/44.34 |
| 6,051,943 A | * | 4/2000 | Rabin et al. ................. | 318/254 |
| 6,317,637 B1 | | 11/2001 | Limroth | |

FOREIGN PATENT DOCUMENTS

| | | | | |
|---|---|---|---|---|
| JP | 2000-47732 | | 2/2000 | |
| JP | 10218306 A1 | * | 2/2000 | ............ G05D 3/12 |
| WO | WO 99/05578 | | 2/1999 | |

* cited by examiner

Primary Examiner—Leo Picard
Assistant Examiner—Michael D. Masinick
(74) Attorney, Agent, or Firm—Kenyon & Kenyon

(57) ABSTRACT

Based on the realization that, at the instant a holding brake in the drive of a machine tool is actuated, it may not be necessary to precisely observe the setpoint values, it may be provided to adapt control parameters in the controller of the drive such that, given an engaged holding brake, oscillations may be avoided or substantially reduced. By applying a correction value to the controller, it may be possible to prevent the adaptation of the control parameters from resulting in a change at the output of the controller.

8 Claims, 1 Drawing Sheet

METHOD FOR ACTUATING A HOLDING BRAKE

CROSS-REFERENCE TO RELATED APPLICATIONS

The present application claims priority to application No. 102 29 350.3, filed in the Federal Republic of Germany on Jun. 29, 2002, which is expressly incorporated herein in its entirety by reference thereto.

FIELD OF THE INVENTION

The present invention relates to a method for actuating a holding brake. Such holding brakes are used in drives having electric motors, in order, for example, to stop the axis driven by the motor when the electric motor is de-energized and, therefore, is not able to assure a reliable stoppage of the axis.

BACKGROUND INFORMATION

An example of an application area for holding brakes is numerically controlled machine tools. For each of the axes of such a machine tool, a drive is provided, the motor of which is controlled via a closed-loop control structure, including, for example, positional controllers, speed controllers and current controllers. In this example, positional values are input by a numerical control and are then converted by the control structure into drive signals for the power circuitry of the motor. In the control parameter setting, the decision is made as to how precisely the drive, including the motor, power circuitry, and control structure, realizes the inputs from the numerical control. Thus, in a PI controller, it is, above all, the gain factors in the proportional and integral parts of the controller that may be important. They determine the intensity of the system's reaction to a deviation from the particular setpoint value.

The drive of a machine tool is, in fact, able to hold an axis in a preset position. However, this is no longer effective when the drive is de-energized, for example due to a power failure. For that reason, on machine tools, it is conventional to provide mechanical holding brakes as well, which are used in the currentless state. To release these holding brakes, a current must flow, for example, through an electromagnet. The need arises, above all, for suspension axes to be stopped via such holding brakes, since without drive control, a movement of the axis can be caused by the gravity of the suspended load.

If it is intended to stop an axis of a machine tool, then it may be an important consideration that the time of the axis-drive control overlap with the time in which the holding brake has already been engaged. Otherwise, one risks a short time span in which the axis is neither stopped by the drive nor by a holding brake.

The control parameters of a drive are optimized for an operation without an engaged holding brake. In a machine tool, in particular, the parameters are often adjusted in a manner which will allow the path deviations of a tool to be corrected very aggressively, in order to keep following errors or servo lag to a minimum. However, the conditions change completely when the holding brake is engaged, since the motor of the drive now suddenly experiences a substantially higher load. This leads to undesirable oscillations in the drive, which can be perceived by a whistling of the motor, for example. These oscillations are not only unpleasant for the operator, they also subject the holding brake to increased wear. It can even happen that the holding brake breaks loose, since the sliding or dynamic friction of a holding brake is distinctly less than the static friction.

Japanese Patent Publication No. 2000-47732 describes, when releasing a holding brake, to switch over between different gain factors in the control loop of a servo drive. By applying a high gain factor immediately after the holding brake is released and by switching over to a lower gain factor some time later, on the one hand, an axis should be prevented from falling and, on the other hand, oscillations in normal operation should be avoided. To avoid oscillations given a simultaneously active brake and active control, however, this procedure is not goal-directed when the brake is engaged, since it is precisely in this case that high gain factors lead to vibrations.

If, as a general principle, the control parameters are selected such that no oscillations occur even when the holding brake is engaged, then this has a negative effect on the quality of the control loop. The same applies to the use of filters in the control loop which avoid such oscillations, even if they are also active when the holding brake is not activated.

It is an object of the present invention to provide a method for actuating a holding brake which may enable oscillations to be avoided or greatly reduced, given a simultaneously active holding brake and active control.

SUMMARY

The above and other beneficial objects of the present invention may be achieved by providing a method as described herein.

At this point, to actuate a holding brake of an electric drive having a motor and control loop, it may be provided to adapt at least one of the control parameters of the control loop in a first step such that, given an applied holding brake, oscillations may be avoided or greatly reduced and, in a second step, to actuate the holding brake.

The foregoing is based on the realization that, on the one hand, given an activated holding brake, a high positioning accuracy may not be required and, on the other hand, a reliable arresting of the driven axis may be possible, even given control parameters which are distinctly changed in comparison to normal operation.

Tests have shown that excellent results may be attained by reducing the gain factors in the proportional and integral parts of a PI-controller, in particular of an rpm or speed controller, by a factor of between two and ten, approximately 100 ms prior to engaging the holding brake. In this manner, oscillations at the moment of the brake application may be able to be nearly completely avoided.

When the switch is made to new control parameters, it may be assured that no change occurs at the output of the particular control loop. A change may lead to unwanted and possibly dangerous movements of the drive. For that reason, a correction value may be fed to the control loop to prevent any change at its output. This may be achieved in a controller having an integral part by adding a correction value to the integrator. This correction value is calculated such, for example, that the sum from, first of all, the deviation from the setpoint value, multiplied by the original proportional gain factor and, second of all, from the integrated deviation from the setpoint value, multiplied by the integral gain factor, corresponds precisely to the sum from, first of all, the deviation from the setpoint value, multiplied by the reduced proportional gain factor and, second of all, from the corrected content of the integrator, multiplied by the integral gain factor. Since, given a reduction in the gain factors, the content of the integrator may be expanded, this will be called a loading of the integrator.

The present invention may be able to be simply implemented using digital controllers, since, in this case, the integrator may be able to be loaded by a simple addition in the memory register of the integrator. The correction value may be calculated, for example, in the software of the numerical control.

Besides the gain factors of the controllers in the control loop, other control parameters may also be adapted in the control loop. As mentioned further above, filters may also be provided, the filter parameters of which, such as frequency, attenuation or time constant, may be effectively adapted to avoid oscillations. Here as well, an important consideration may be that no change occur at the output of the control loop which may be a sudden disturbance to the motor, and may then have to first be compensated by the control again.

The method described for actuating a holding brake may also be used for releasing a holding brake. For this purpose, given an engaged holding brake, the controller of the drive is initially put in operation with control parameters which may avoid or greatly reduce the oscillations. Only then is the holding brake released, and a short time later, possibly in consideration of a suitable correction value, is the switch made to the control parameters required for a high control performance.

The method according to the present invention may be suited for rotary drives and/or for linear drives.

Further aspects of the present invention and details pertaining thereto are derived from the following description of an example embodiment, on the basis of the Figures.

DETAILED DESCRIPTION

Figure 1:
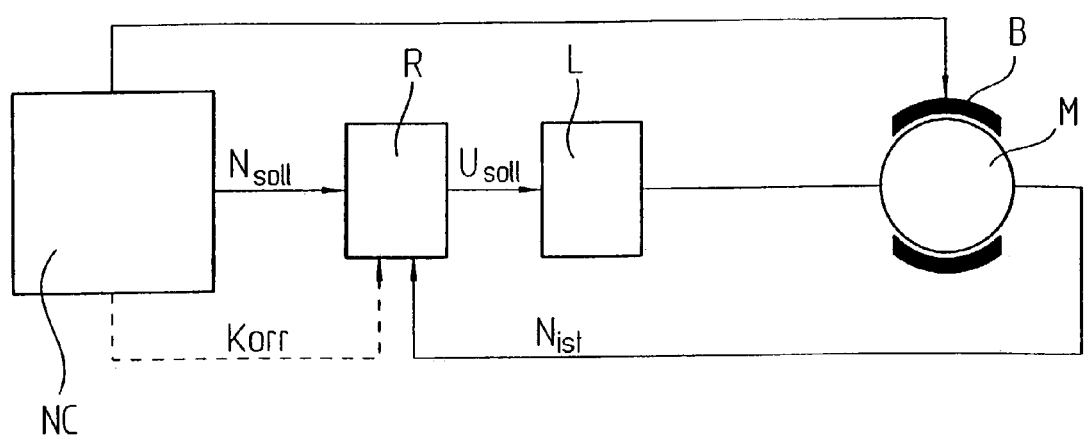
FIG. 1 is a schematic view of a numerically controlled drive having a holding brake.

In FIG. 1, a numerical control NC is illustrated, which controls a drive made up of a controller R, a power circuitry section L, and a motor M. Numerical control NC supplies a setpoint value Nsetpoint (Nsoll) for the speed of motor M to controller R. Controller R makes available voltage setpoint values Usetpoint (Usoll) for power circuitry section L, which control motor M, for instance, via a pulse-width modulation. A tachometer monitors the speed of motor M and feeds back an actual value Nactual (Nist) of the speed to controller R. Current sensors, which supply current actual values to the controller, are also provided. A holding brake B is used for arresting the axis and may be actuated via numerical control NC.

Figure 2:
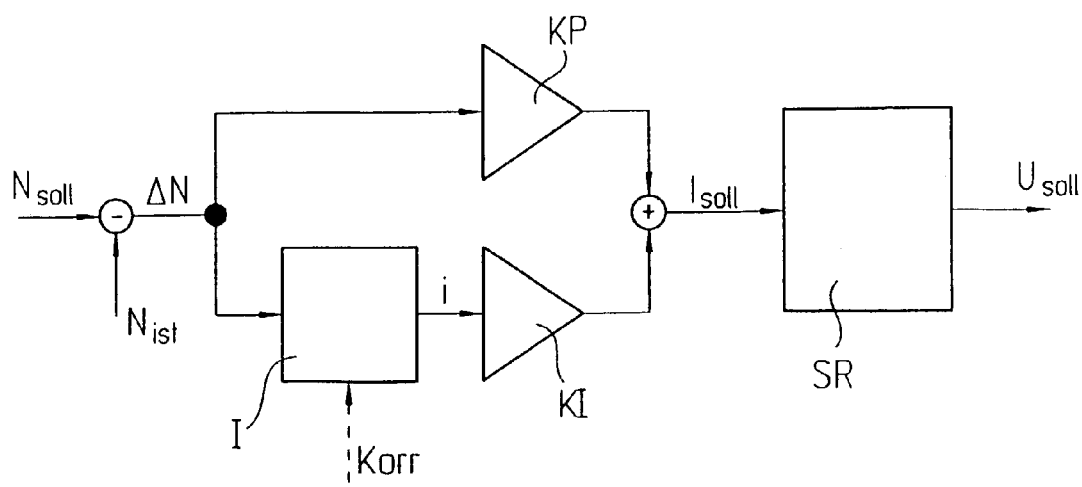
FIG. 2 is a schematic view of a control loop having a speed controller and current controller.

In controller R, which is illustrated in greater detail in FIG. 2, there is a PI controller for the speed and a current controller SR. This system may be used, for example, to drive a tool spindle.

If a positioning axis is to be driven, then controller R may be supplemented with a series-connected positional controller, which receives a positional setpoint value from numerical control NC and a positional actual value from a position sensor and supplies a speed setpoint value Nsetpoint (Nsoll) to the speed controller.

FIG. 2 illustrates how a current setpoint value is generated for current controller SR from the difference $\Delta N$ between speed setpoint value Nsetpoint (Nsoll) and speed actual value Nactual (Nist). In the proportional part, difference $\Delta N$ is multiplied by a proportional gain factor KP. In the integral part, difference $\Delta N$ is integrated as a function of time in integrator I, and integral sum i is multiplied by an integral gain factor KI. The sum of the two multiplications is applied as current setpoint value Isetpoint (Isoll) at the output of the speed controller. As mentioned, from this, current controller SR generates a voltage setpoint value Usetpoint (Usoll), which is transmitted to power circuitry section L.

To engage holding brake B, at this point, in a first step, at least one control parameter is adapted in the control loop, here by a clear reduction in gain factors KP and KI. At this moment, it is no longer a question of precisely adhering to the predefined speed, i.e., to a good positioning accuracy. Thus, this reduction may not have any adverse effect. Since by reducing the gain factors KP and KI, the output of speed controller Isetpoint (Isoll) may change, a correction value Korr may be fed, however, to the speed controller to prevent this.

This may be achieved most simply when integrator I is loaded accordingly. Correction value Korr is able to be calculated, as described above, from the condition that changing gain factors KP and KI may not result in a change at the output of the speed controller. If the original gain factors are designated by KP1 and KI1, the reduced gain factors by KP2 and KI2, then it may hold that:

$$\Delta N*KP1+i*KI1=\Delta N*KP2+(i+\text{Korr})*KI2$$

From this condition, a suitable correction value Korr is able to be calculated in numerical control NC. This correction value keeps the current-setpoint value Isetpoint (Isoll) constant in response to a change in gain factors KP and KI in the speed controller.

From the above relation one may also recognize that, in practice, prior to reduction of control parameters KP, KI, it may be beneficial to wait for a compensated state, so that $\Delta N$ vanishes. Less of a correction may be needed in the described case. In other control systems, a correction may even be entirely superfluous, for instance when in the integral part of a PI controller, $\Delta N$ is already multiplied by a gain factor KI, and this product is first integrated (thus, in FIG. 2, integrator I and amplifier KI are interchanged). At the output of the controller, a change in gain factors KP, KI, may not result, namely, in a change at $\Delta N=0$. Gain factors KP, KI may be first adapted upon stoppage of motor M.

Holding brake B is first engaged in the second step, in practice, approximately 50–200 ms following reduction of gain factors KP and KI. At this point, oscillations of motor M caused by poorly adapted control parameters may be reliably prevented, due to the reduced control parameters.

In the method described herein, it may not necessarily be a question of the sequence of the two steps. A functional sequence is also possible, where holding brake B is first engaged, and, only then, possibly only in response to the occurrence of oscillations, are gain factors KP, KI reduced. In some instances, however, additional outlay may be required to detect the oscillations, and oscillations may no longer be able to be completely avoided. When releasing holding brake B, it may be, however, practical to reverse the described sequence, since controller R is put into operation here with reduced gain factors KP, KI, and higher gain factors KP, KI are not employed until after holding brake B is released. Here, as well, a change at the output of controller R may be avoided, as described.

If controller R is a digital controller, then the necessary adaptations may be able to be accomplished quite easily. The content of integrator I may be easily read out to perform a calculation in accordance with the above equation and be utilized, for example, in numerical control NC to calculate correction value Korr. In the same computing cycle, in which gain factors KP, KI are reduced, correction factor Korr may be loaded into integrator I, so that no abrupt change occurs at the output of the speed controller.

What is claimed is:

1. A method for actuating a holding brake of an electric drive having a motor and control loop using adaptable control parameters, comprising:
   adapting at least one control parameter such that, in accordance with an engaged holding brake, oscillations are reduced;
   actuating the holding brake; and
   awaiting a compensated state before the control parameters are adapted in the adapting step.

2. The method according to claim 1, wherein the control parameters are adapted in the adapting step such that no change occurs at an output of the control loop.

3. The method according to claim 2, further comprising feeding the control loop a correction value that avoids a change at the output of the control loop caused by the adapting of the control parameters.

4. The method according to claim 3, further comprising changing content of an integrator of the control loop by the correction value such that an output of the controller is not changed by the adapted control parameters.

5. The method according to claim 1, further comprising:
   reducing a proportional gain factor and an integral gain factor in the control loop before the holding brake is engaged; and
   increasing the proportional gain factor and the integral gain factor after the holding brake is released.

6. The method according to claim 5, wherein the proportional gain factor and the integral gain factor are reduced in the reducing step in one of an rpm and a speed controller.

7. A numerical control for a machine tool, comprising:
   a controller;
   a motor;
   a holding brake; and
   an arrangement configured to perform a method for actuating the holding brake using adaptable control parameters, the method including the steps of:
     adapting at least one control parameter such that, in accordance with an engaged holding brake, oscillations are reduced;
     actuating the holding brake; and
     awaiting a compensated state before the control parameters are adapted in the adapting step.

8. A numerical control for a machine tool, comprising:
   a controller;
   a motor;
   a holding brake; and
   means for performing a method for actuating the holding brake using adaptable control parameters, the method including the steps of:
     adapting at least one control parameter such that, in accordance with an engaged holding brake, oscillations are reduced;
     actuating the holding brake; and
     awaiting a compensated state before the control parameters are adapted in the adapting step.

* * * * *